March 15, 1949. J. H. STOVER, III 2,464,729
APPARATUS FOR MANUFACTURING LOCK NUTS
Filed Oct. 9, 1945 11 Sheets-Sheet 1
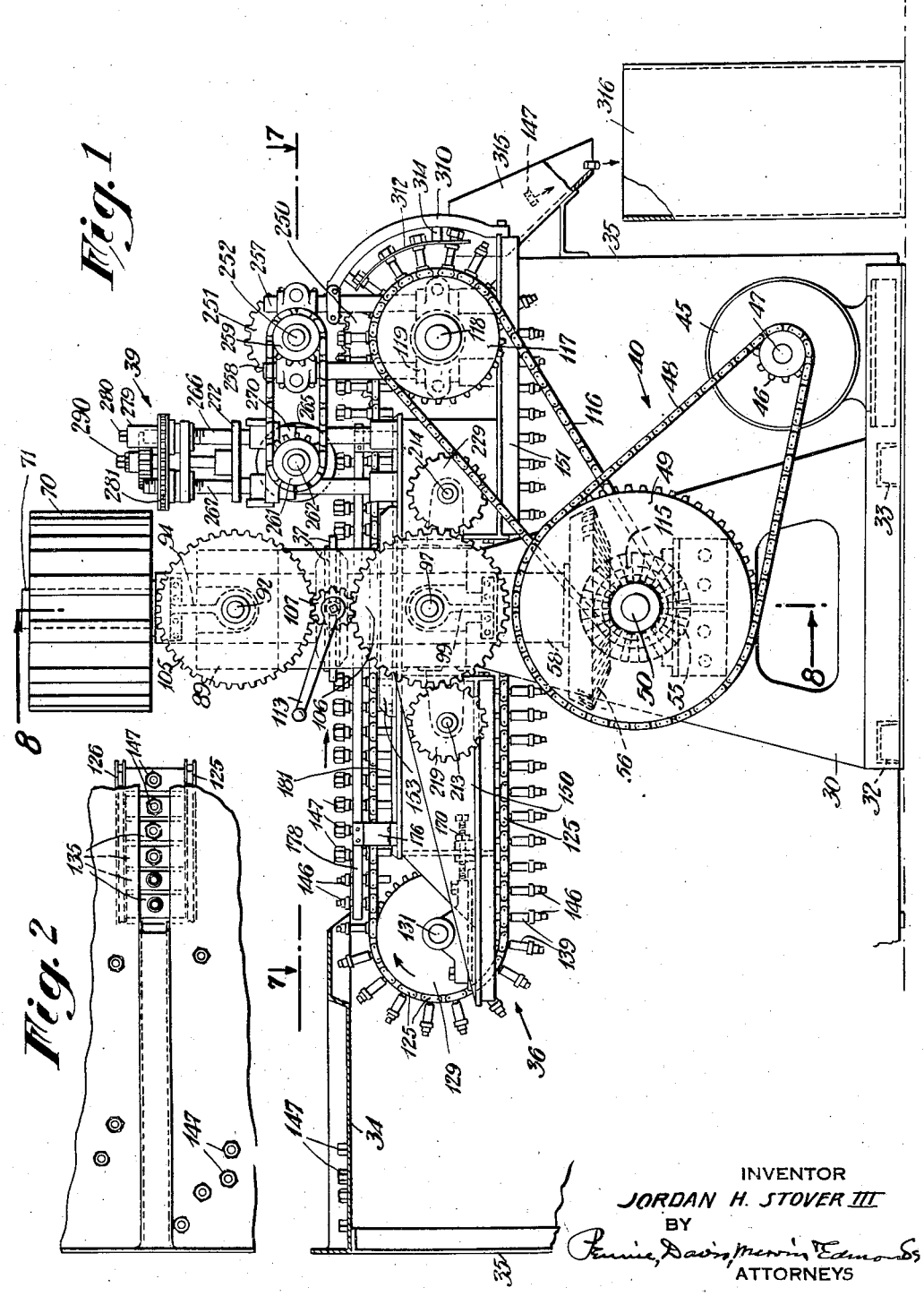
INVENTOR
JORDAN H. STOVER III
BY
ATTORNEYS

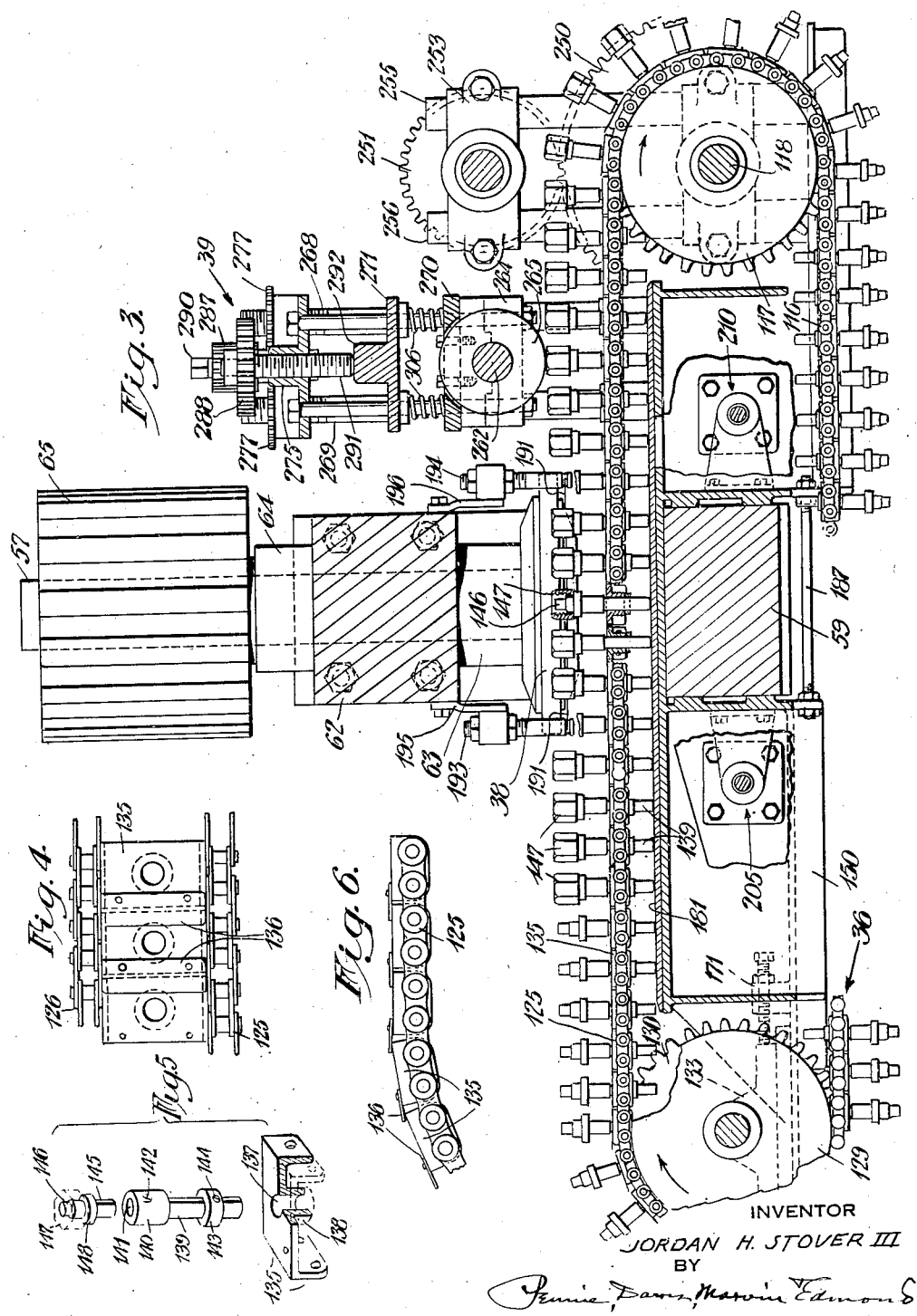

March 15, 1949. J. H. STOVER, III 2,464,729
APPARATUS FOR MANUFACTURING LOCK NUTS
Filed Oct. 9, 1945 11 Sheets-Sheet 4
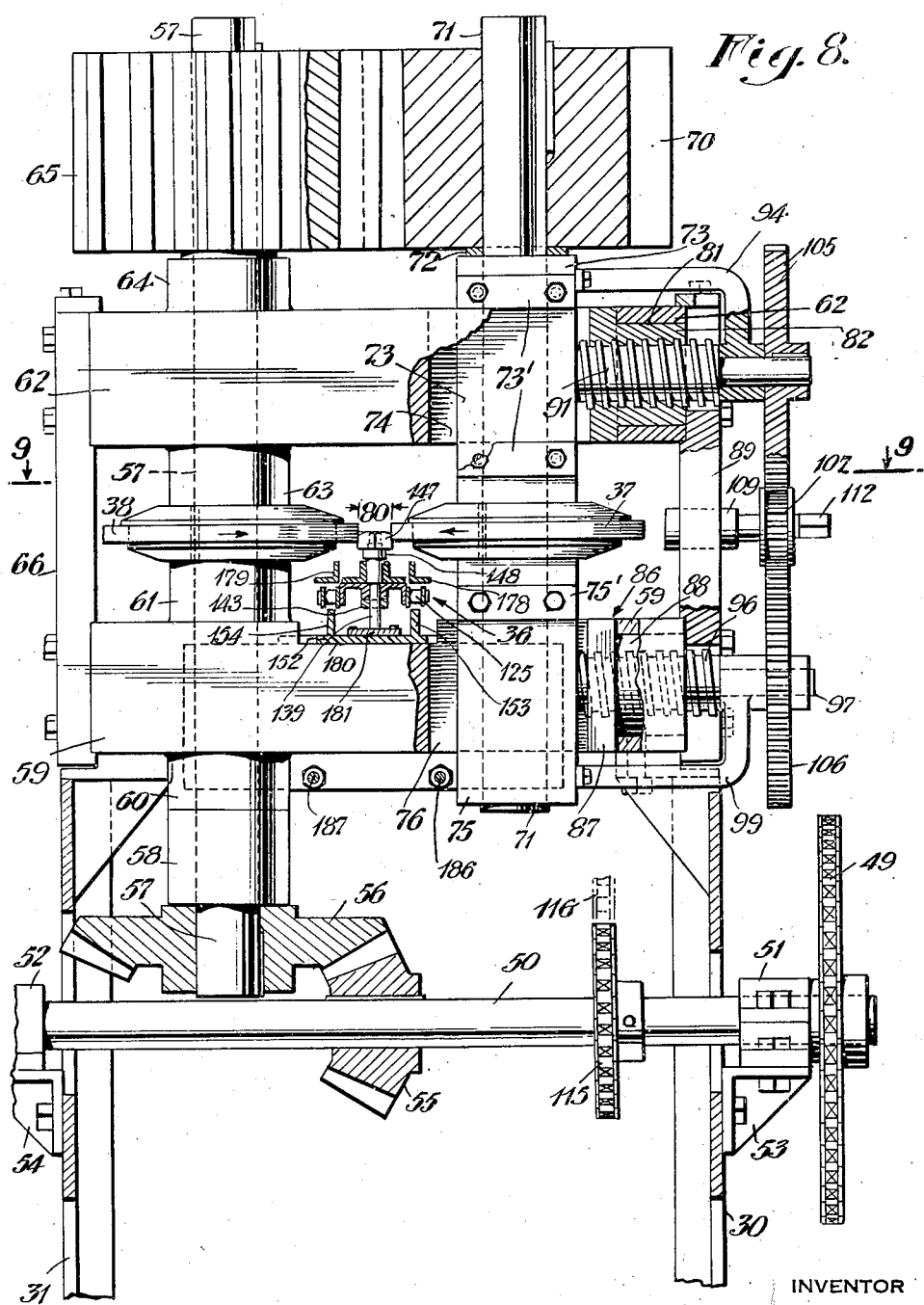
Fig. 8.
INVENTOR
JORDAN H. STOVER III
BY
ATTORNEYS March 15, 1949. J. H. STOVER, III 2,464,729
APPARATUS FOR MANUFACTURING LOCK NUTS
Filed Oct. 9, 1945 11 Sheets-Sheet 5
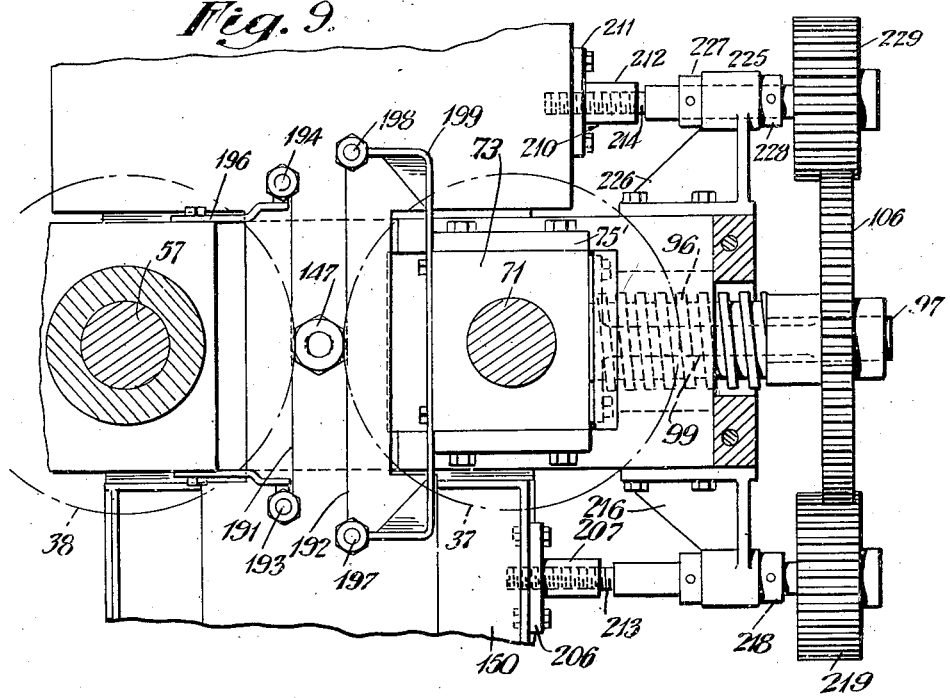
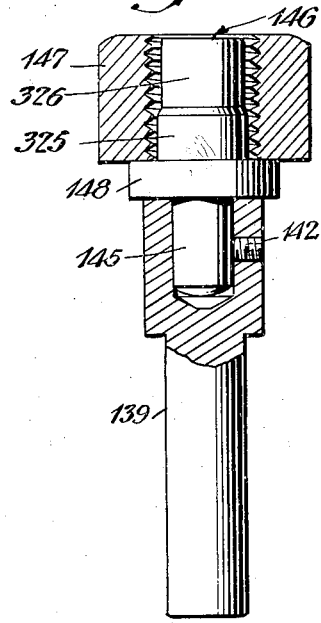
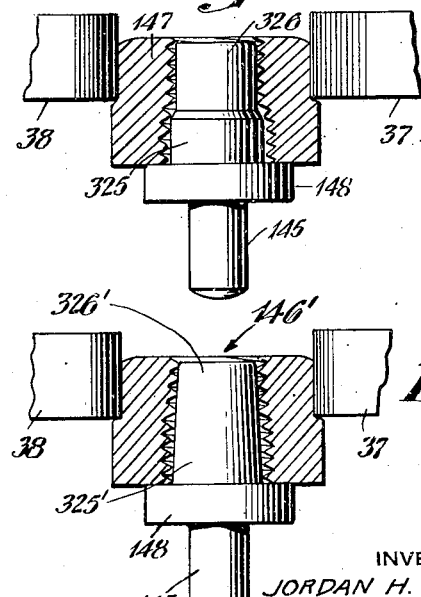
INVENTOR
JORDAN H. STOVER III
ATTORNEYS March 15, 1949.  J. H. STOVER, III  2,464,729
APPARATUS FOR MANUFACTURING LOCK NUTS
Filed Oct. 9, 1945  11 Sheets-Sheet 6
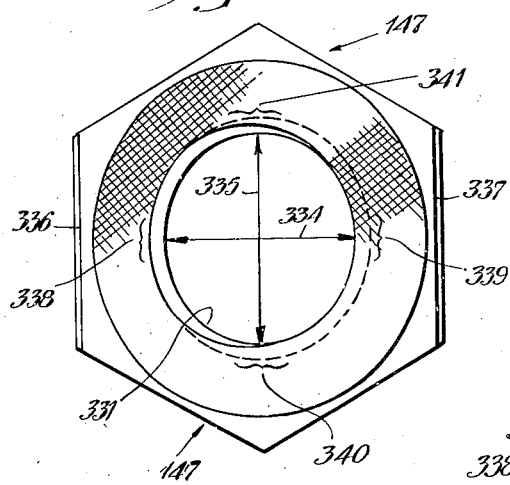
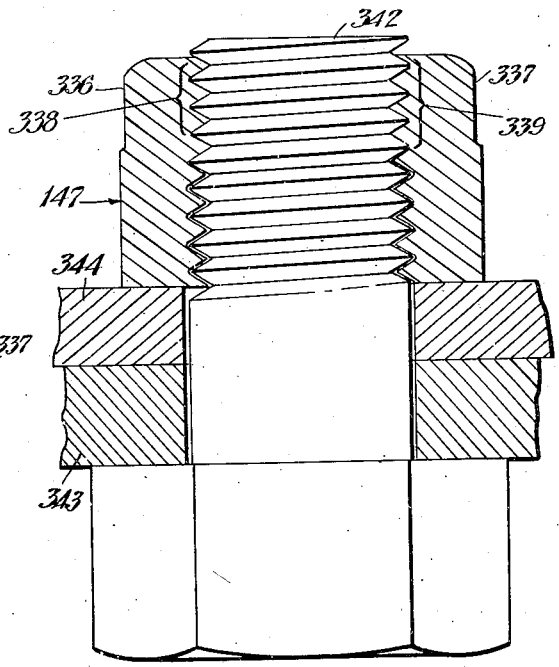
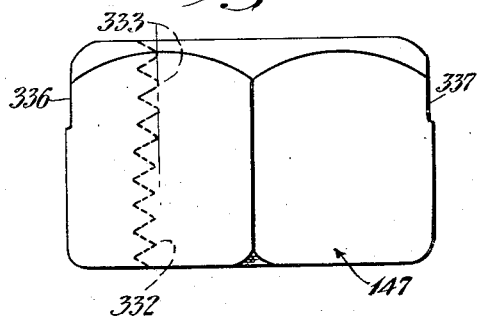
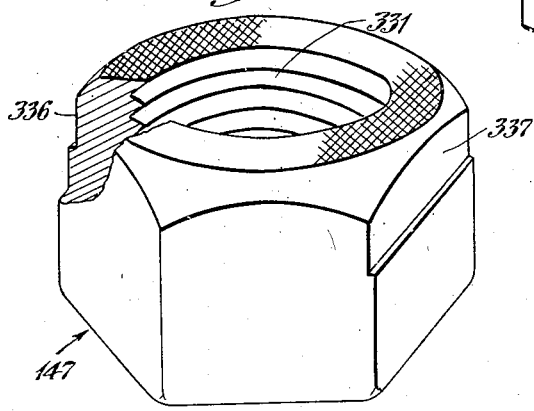
INVENTOR
JORDAN H. STOVER III
BY
ATTORNEYS

INVENTOR
JORDAN H. STOVER III
BY
ATTORNEYS

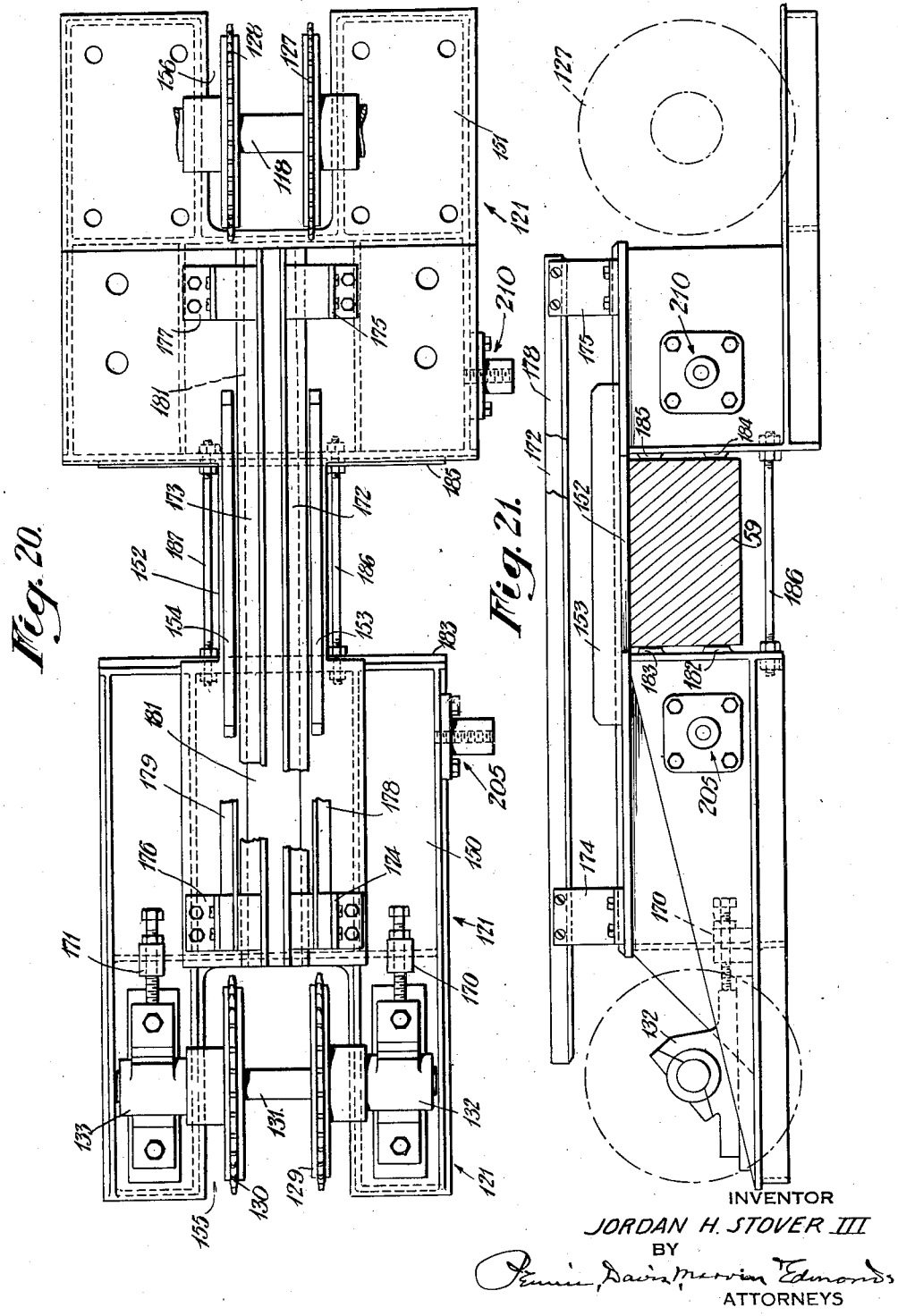

March 15, 1949. J. H. STOVER, III 2,464,729
APPARATUS FOR MANUFACTURING LOCK NUTS
Filed Oct. 9, 1945 11 Sheets-Sheet 10
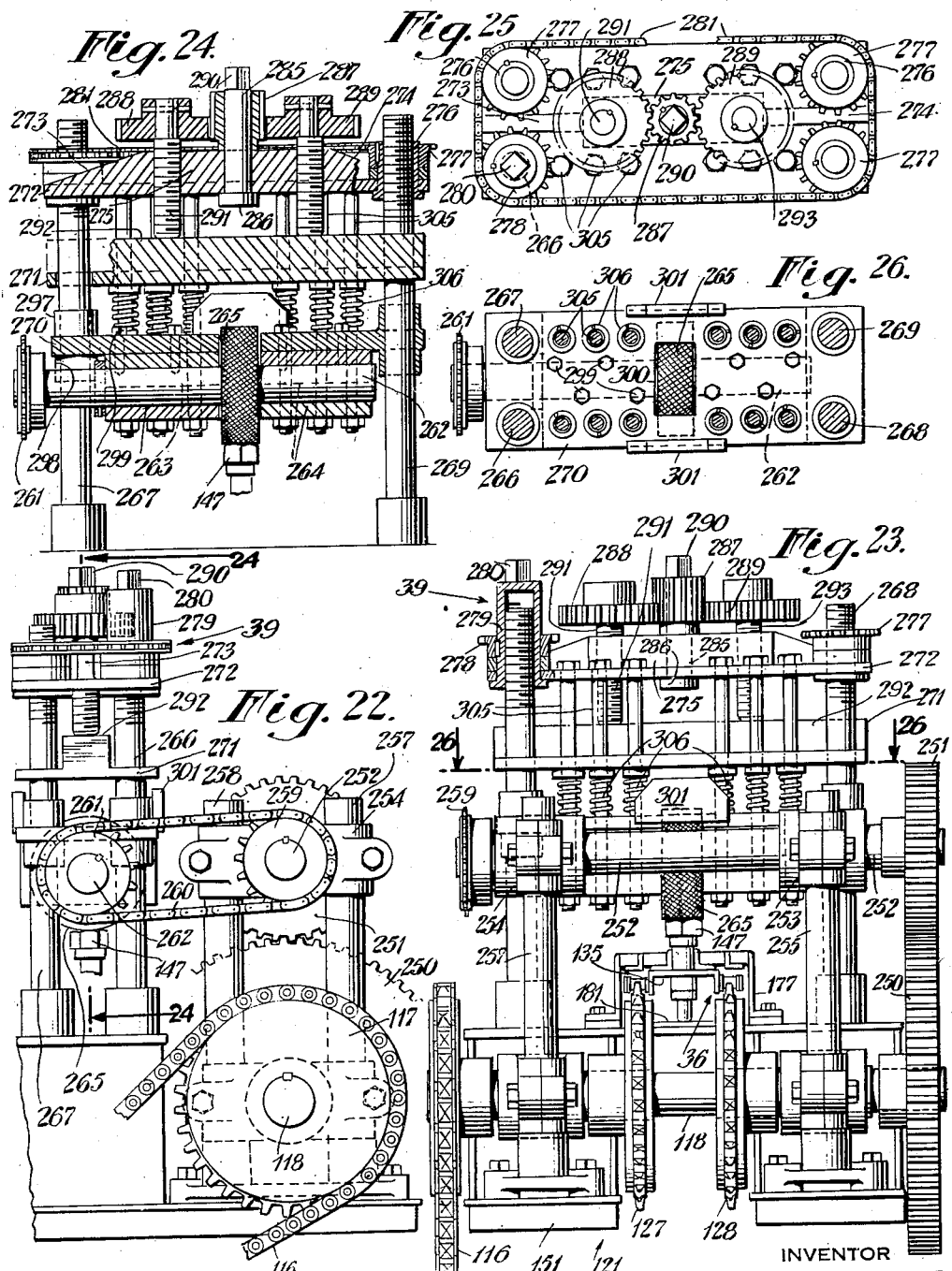
INVENTOR
JORDAN H. STOVER III
BY
ATTORNEYS

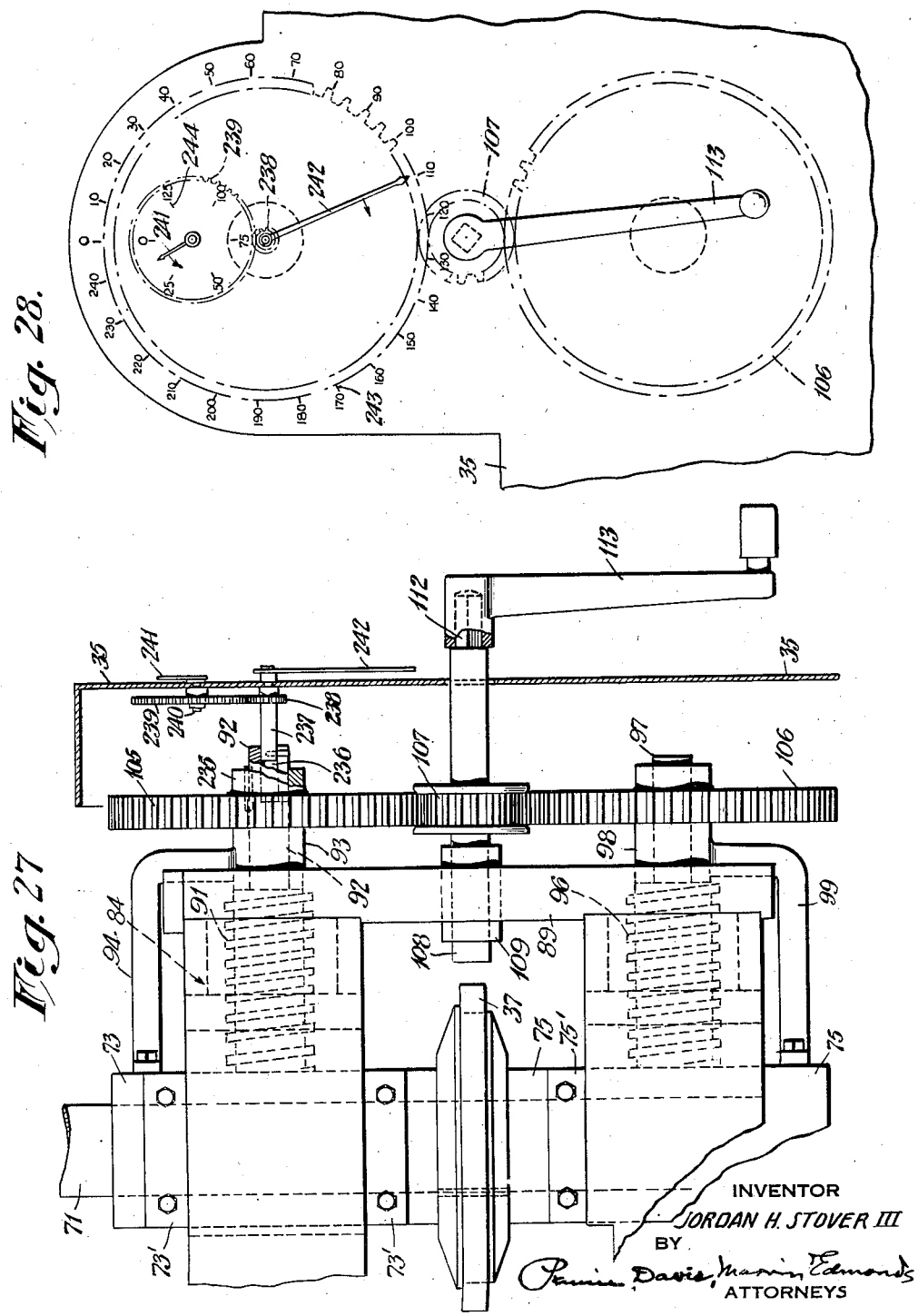

Patented Mar. 15, 1949

2,464,729

UNITED STATES PATENT OFFICE 2,464,729

APPARATUS FOR MANUFACTURING LOCK NUTS

Jordan H. Stover, III, Easton, Pa., assignor to Stover Lock Nut & Machinery Corporation, a corporation of Delaware Application October 9, 1945, Serial No. 621,266

25 Claims. (Cl. 10—72)

This invention relates to lock nuts and has for its object certain improvements in the apparatus for making lock nuts.

Nuts ordinarily are made with a pitch diameter sufficiently greater than the pitch diameter of a mating bolt so that the nut may be screwed freely onto the bolt. This so-called fit tolerance may vary considerably, depending upon the size of the nut and the fineness of fit desired. In any event, however, it is sufficient so that until the nut on the bolt comes into engagement with the work to be held, the threads of the nut do not exert any substantial pressure on either the upper or the lower side of the bolt threads, and in consequence there is only slight friction and resistance to turning. When the nut becomes tightened against the work, the upper sides of the threads on the nut contact the lower sides of the threads on the bolt with a pressure determined by the force with which the nut is tightened, and the friction resulting from the pressure between the inter-engaging sides of the threads serves to hold the nut in its tightened position.

The objection to this kind of nut is that it is easily loosened, because whenever the pressure between the lower end of the nut and the work is relieved as a result of vibration, wear, or other cause, the pressure between the inter-engaging sides of the threads is also relieved so that there is no longer sufficient friction to prevent the nut from being slowly backed off the bolt by vibration, shock, or the like.

Many different expedients have been proposed, and some have come into general use, to prevent accidental loosening of tightened nuts. The well-known split lock-washer, the use of a separate lock nut and the use of cotter pins through cotter ways formed in the nut and through a hole in the bolt, are probably the most familiar of these expedients. Another proposal is to insert elestic material in a groove specially provided around the threaded hole of a nut to provide a locking effect. The effective use of such a nut is limited to the life of the elastic material while continued in use with the work to which it is first applied or the nut is greatly limited in the number of times it can be re-used because of damage to and loss of elesticity of the elastic material. Other expedients have involved cutting specially shaped and finely made threads on both nut and bolt, and the provision of special lock sections formed integrally with or attached to the nut. Proposals also have been made to deform the nut as a whole, or to provide specially formed sections of the nut which may be deformed to lock with the bolt. Such sections often are slotted in various ways with the idea of enhancing the locking action of the deformed section. These various prior expedients are subject to the disadvantage that a separate locking piece is required, or to the disadvantage of being ineffective or only moderately effective, and difficult and expensive to manufacture accurately and in quantity. For example, proposals to distort the nut over its entire length have been unsuccessful, because nuts so distorted to an effective degree cannot be started on the bolt except with great difficulty. Proposals to deform specially provided sections of the bolt have been unsuccessful because the deformed sections, which commonly are slotted in some manner, do not provide a satisfactory lock and are expensive to manufacture.

Another lock nut proposed is one with opposite sides of a blank nut forced toward one another to provide an oval or elliptical opening at the top while maintaining the lower part of the hole of the nut cylindrical or circular. Although such a lock nut was proposed many years ago in British Patent 1003 of 1880, so far as it known it has had no commercial success. If the lock nut is deformed too little, it is worthless. If it is deformed too much, it is not satisfactory because use of the lock nut damages the threads of the nut as well as of the bolt or mating screw, and the desired non-slipping gripping action is not obtained. If the insufficiently deformed lock nut is given additional deformation, there is however no way of telling whether the deformation is too much or too little, except by actual use. Actual use is out of the question when the lock nuts are made by the thousands and shipped to remote parts for unfailing use.

Investigation confirms my discovery that lock nuts of the proper type and amount of deformation may be consistently reproduced or duplicated and that the deformation is sufficient to assure adequate gripping or locking action between the lock nuts and their mating bolts or screws.

The lock nut preferably comprises a nut blank having a threaded opening, opposite sides of the main body of the blank being compressed at the top portion thereof to a depth of ¼ to ½ the nominal diameter of the mating screw beyond the elastic limit of the blank to provide a permanent distortion in the blank and to cause the top of the opening to assume a generally alliptical shape with the sides of the opening on the minor axis pushed toward one another and with the sides of the opening on the major axis pushed away from one another while the bottom of the opening remains substantially circular with a diameter greater than the minor axis and less than the major axis. The width of the top of the opening along the minor axis is reduced by the distortion by an amount equal to the fit tolerance plus 0.001 to 0.010 inch.

In a presently preferred practice, the width of the top of the opening along the minor axis is reduced by the distortion by an amount to produce a friction locking torque of 115 $D^{2.4}$ to 820 $D^{2.5}$ on a mating screw within the dimension tolerances of its class of fit; in which D equals the nominal diameter of the mating screw and the result obtained is pound inches of torque.

In accordance with the apparatus of the invention, it comprises a mandrel adapted to be inserted in the threaded opening of a blank nut, the mandrel being provided with a stop portion of predetermined size, and means for forcing the opposite sides of the nut toward one another until threads in the opening of the nut engage the stop portion of the mandrel to distort the nut a predetermined amount.

The depth of squeeze of the upper portion of the main body of the blank is highly important. A decrease in the depth of squeeze results in less sensitivity (variation of friction torque in relation to change in bolt diameter) to bolt diameter and less life (re-use factor). An increase in the depth of squeeze results in greater sensitivity to bolt diameter and greater life. The object is to select a depth of squeeze adapted to yield the least sensitivity with the greatest life. If the depth of squeeze is less than ¼ of the bolt diameter, the life of the lock nut is less than its practical limit. If the depth of squeeze is more than ½ of the bolt diameter, the sensitivity of the lock nut is beyond the practical limit. For these reasons, opposite sides of the main body of the blank are compressed only at the top portion thereof to a depth of ¼ to ½, preferably about ⅜, the nominal diameter of the mating screw or bolt. This is particularly true of nuts ranging, for example, from #8 machine screw to 1″ in size.

Lock nuts of the character described may be readily applied to a bolt or mating screw. They may be screwed on part way by hand since the lower part of the nut is substantially undistorted. At this point, the inwardly slanting opposite sides of the threaded opening in the nut come into contact with the bolt threads and as the nut is screwed on further, the bolt threads force the compressed sides of the nut apart against the spring action of the distorted nut.

These and other advantages of the invention will be better understood by referring to the accompanying drawing, taken in conjunction with the following description, in which—

Fig. 1 is a side elevation of an apparatus illustrative of a practice of the invention, for the most part showing its inner mechanism and not its outer casing or covering;

Fig. 2 is a partial plan view of the loading end of the mechanism;

Fig. 3 is a vertical sectional view of the apparatus, taken approximately along the line of travel of the mandrel, showing the endless conveyor and part of the driving mechanism;

Fig. 4 is a partial plan view of the endless conveyor;

Fig. 5 is an exploded view of a unit of the endless conveyor showing a sprocket chain link, a mandrel support and a mandrel with a nut mounted thereon;

Fig. 6 is a fragmentary side view of a small section of the endless conveyor;

Fig. 8 is a sectional view on the line 8—8 of Fig. 1, showing the mounting of the squeeze rolls, the mechanism for driving the same and a portion of the adjusting mechanism for moving one of the squeeze rolls laterally;

Fig. 9 is a fragmentary sectional view on the line 9—9 of Fig. 8, showing the adjusting mechanism for moving the endless conveyor and its associated parts laterally, the squeeze rolls in phantom and part of the adjusting mechanism for moving one of the squeeez rolls laterally;

Fig. 10 is an enlarged sectional view of the mandrel support, showing a generally cylindrical mandrel and a nut mounted thereon, before it is deformed, similar to the assembly shown in Fig. 5;

Fig. 11 is a similar sectional view showing the nut after it has been deformed by the squeeze rolls;

Fig. 12 is a view similar to Fig. 11 but showing a generally tapered mandrel;

Fig. 13 is a plan view of a lock nut illustrative of the invention;

Fig. 14 is a side elevation;

Fig. 15 is a perspective view partly in section;

Fig. 16 is a side elevation partly in section, showing the lock nut and a bolt in applied form;

Fig. 20 is a general plan view of the endless conveyor support and its related parts, the endless conveyor itself being omitted except for its chain sprockets;

Fig. 21 is a side view, similar to Fig. 1, of the endless conveyor support and its related parts, the endless conveyor itself being omitted except for its chain sprockets, which are shown in phantom;

Fig. 22 is an enlarged elevational view of the knurling device shown in Figs. 1 and 3;

Fig. 23 is an end view of the same knurling device;

Fig. 24 is a section on the line 24—24 of Fig. 22;

Fig. 25 is a plan view confined to the tension control mechanism of the knurling device;

Fig. 26 is a sectional view on the line 26—26 of Fig. 23;

Fig. 27 is an enlarged elevational view of the adjusting mechanism for moving one of the squeeze rolls laterally, as shown in Figs. 1, 7, 8, 9, 17 and 19, and showing more particularly the connecting mechanism with an indicator for showing the amount of lateral movement of the squeeze roll; and Fig. 28 is a front view of the indicator and its associated mechanism.

Figure 7:
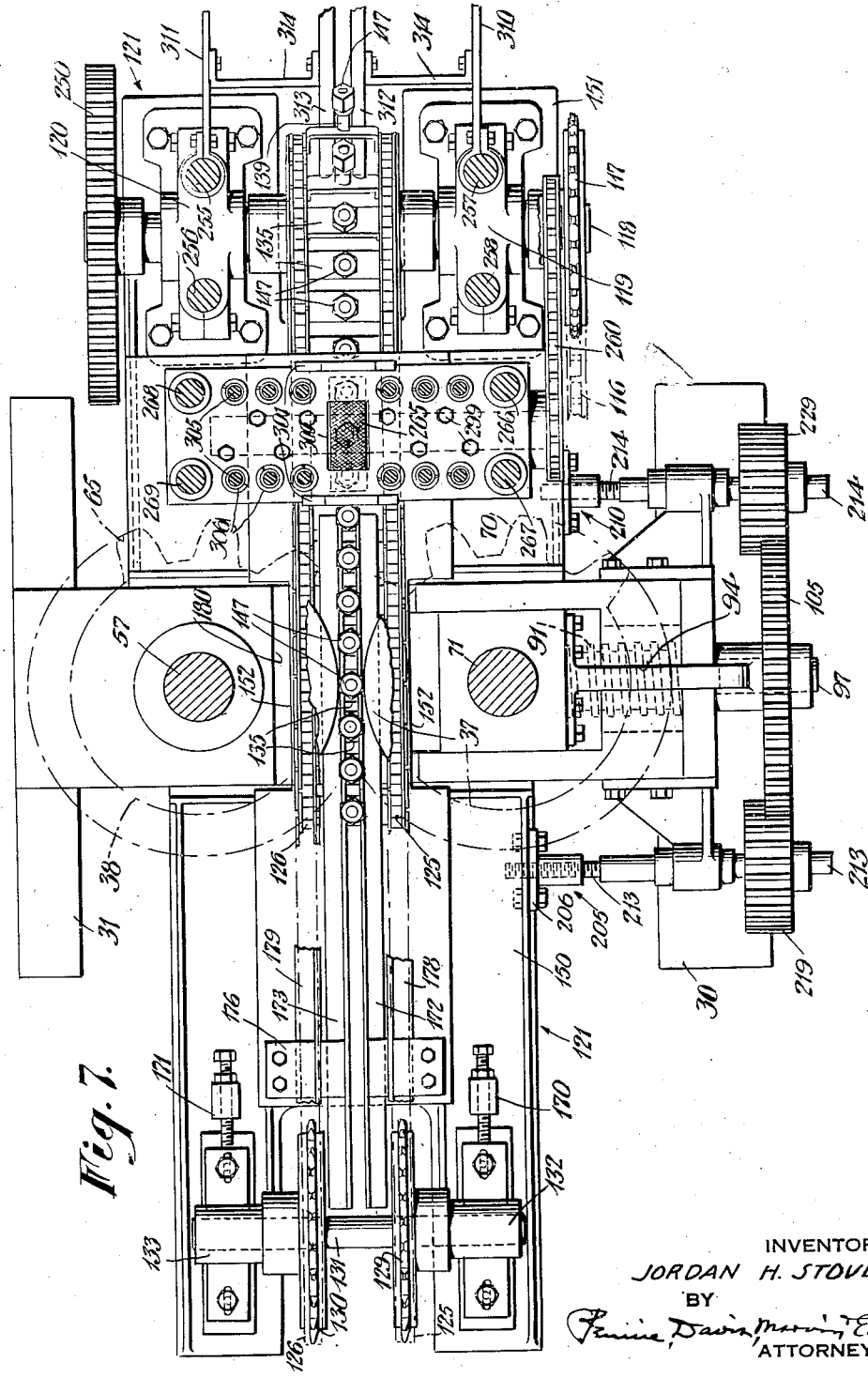
Fig. 7 is a sectional plan view on the line 7—7 of Fig. 1, showing the endless conveyor, the squeeze rolls, the driving mechanism for the endless conveyor, the adjusting mechanism for moving the endless conveyor laterally and a portion of the driving mechanism for the knurling device.

Referring first to Fig. 1, the nut deforming and knurling apparatus comprises a pair of upright spaced pedestals 30 and 31 maintained in spaced relationship at their bottom by means of a plurality of channels 32, 33. The pedestals in turn support a loading table 34, a casing or cover 35, most of which is shown broken away, an endless conveyor 36, a pair of spaced and opposed squeeze rolls 37 and 38, a knurling device 39, and the necessary driving mechanism 40 for operating the apparatus. The driving mechanism comprises a motor 45 with a chain sprocket 46 mounted on a shaft 47. An endless sprocket chain 48 is mounted on the sprocket and a larger sprocket 49 mounted on a drive shaft 50. The drive shaft is employed to drive the endless conveyor as well as the squeeze rolls.

Figure 19:
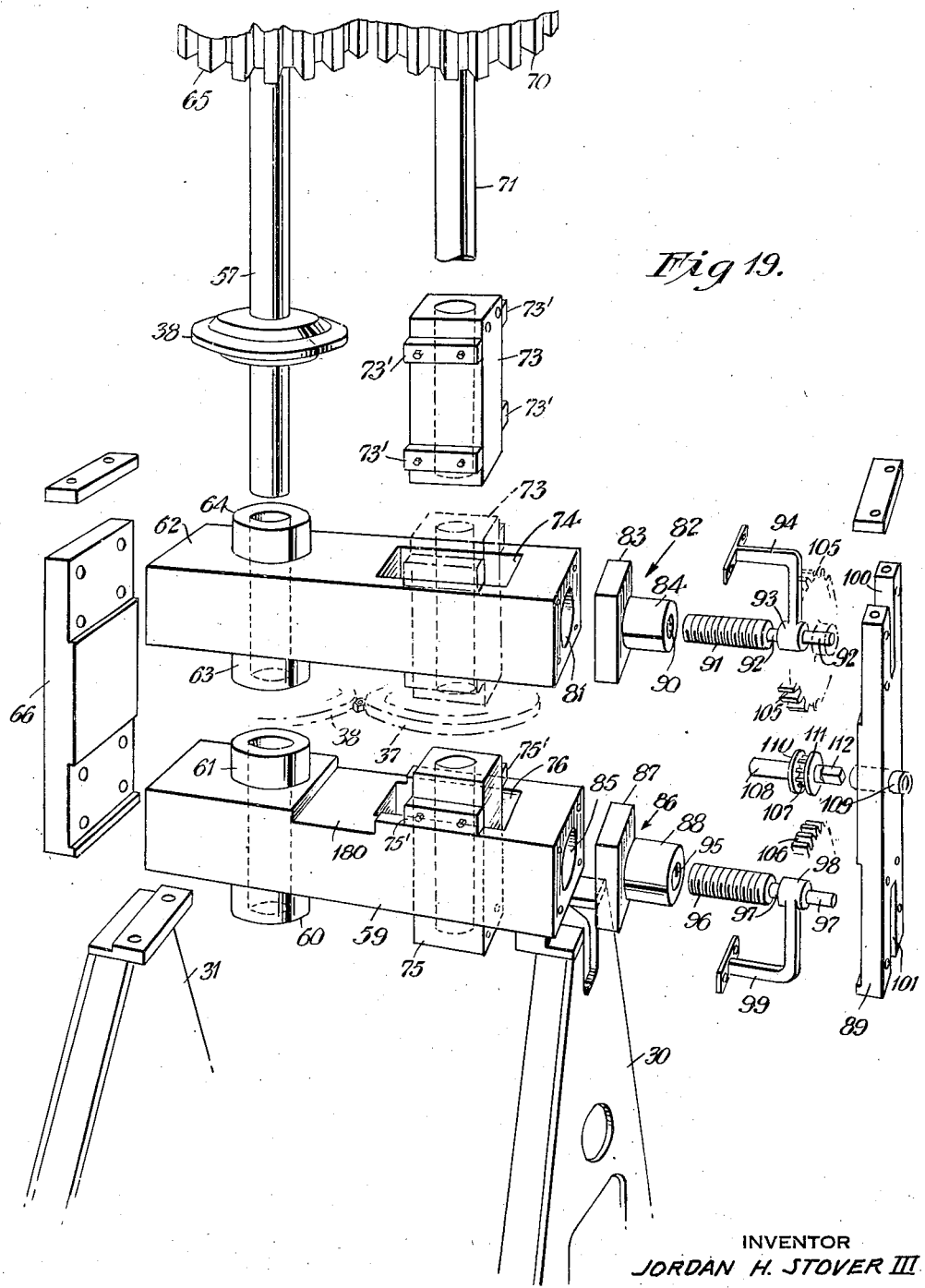
Fig. 19 is an exploded view showing the pedestals, the fixed bearing blocks and the movable bearing blocks for the drive shafts of the squeeze rolls and the appurtenant parts in the adjustment mechanism for moving one of the rolls laterally.

Referring next to Figs. 8 and 19, sprocket 49 and drive shaft 50 are supported in fixed bearings 51 and 52 suitably mounted on brackets 53 and 54 secured to pedestals 30 and 31, respectively. A bevel pinion 55 is suitably secured to an intermediate portion of drive shaft 50, the bevel pinion meshing with a bevel gear 56 integrally mounted on the lower end of vertical shaft 57. The shaft extends upwardly through a collar 58, a lower fixed bearing block 59 provided with a lower bearing hub 60, and an upper bearing hub 61, squeeze roll 38, upper fixed bearing block 62 provided with a lower bearing hub 63 and an upper bearing hub 64, and a spur gear 65 integrally secured to the upper end. An end plate 66 is bolted to the ends of lower fixed bearing block 59 and upper fixed bearing block 62. Spur gear 65 meshes with a companion spur gear 70 integrally secured to the upper end of a vertical shaft 71. This shaft extends successively through an anti-friction washer 72, an upper laterally sliding bearing block 73, provided with four (4) guide bars 73', as shown, extending through a complementary slot 74 in upper fixed bearing block 62, squeeze roll 37, a lower laterally sliding bearing block 75, provided with guide bars 75', as shown, extending through a complementary slot 76 in lower fixed bearing block 59.

The arrangement shown permits a variable space 80 between squeeze rolls 37 and 38. The apparatus is so designed that the space may be varied to accommodate nuts of various sizes. To this end, upper fixed bearing block 62 is provided at its end with a lateral opening 81 accommodating a draw nut 82. The draw nut, as shown in Fig. 19, is provided with a generally rectangular end or base portion 83 and a cylindrical hub portion 84 adapted to fit snugly in slot 74 and lateral opening 81, respectively. In similar fashion, lower fixed bearing block 59 is provided at its end with a lateral opening 85 accommodating a draw nut 86. The latter draw nut, as also shown in Fig. 19, is provided with a generally rectangular end or base portion 87 and a cylindrical hub portion 88 adapted to fit snugly in slot 76 and lateral opening 85, respectively. An end plate 89 is secured to the free ends of lower fixed bearing 59 and upper fixed bearing block 62, as shown in Fig. 8, by a plurality of bolts. Cylindrical hub portion 84 of draw nut 82 is in turn provided with a lateral square-threaded opening 90 into which fits a complementary square-threaded draw screw 91, the other end of which terminates in a shaft extension 92 extending through the bearing 93 of a draw bar 94 secured to upper lateral sliding bearing block 73 by means of a plurality of bolts. In similar fashion, hub portion 88 of draw nut 86 is provided with a lateral square-threaded opening 95 into which fits a complementary square-threaded draw screw 96, the other end of which terminates in a shaft extension 97 extending through the bearing 98 of a draw bar 99 secured to lower lateral sliding bearing block 75 by means of a plurality of bolts.

As shown in Figs. 8 and 19, end plate 89 is provided at its end with slots 100 and 101 to accommodate draw screws 91 and 96, respectively. A squeeze roll adjustment gear 105 is integrally secured to the free end of shaft extension 92, the hub portion of the gear being in contact with hub 93 of draw bar 94 to make a tight assembly. A complementary squeeze roll adjustment gear 106 is integrally secured to the free end of shaft extension 97, the hub portion of the gear being in contact with hub 98 of draw bar 99 to make a tight assembly. A squeeze roll adjustment pinion 107 fits in meshed engagement with and between adjustment gears 105 and 106, the pinion being integrally secured to a shaft 108, the inner end of which fits in a sleeve bearing 109 fitted in and secured to the midportion of end plate 89. A pair of spaced flanges 110 and 111 provide a space in which gears 105 and 106 may turn in meshed engagement with the teeth of pinion 107. The other end of shaft 108 is squared into a gripping portion 112 adapted to fit into a socket crank 113 (see also Figs. 1 and 27).

Taking up endless conveyor 36, which is shown in Figs. 1, 3, 4, 5, 6, 7, 8, 20 and 21, particularly, it will be seen that a conveyor drive sprocket 115 is secured to power drive shaft 50. An endless drive chain 116 is mounted on sprocket 115, and a sprocket 117 integrally mounted on a power take-off shaft 118 (see Figs. 1 and 7). The shaft is in turn mounted in a pair of spaced bearings 119 and 120 attached to a generally horizontal support 121 by a plurality of bolts (see Fig. 7). The endless conveyor proper comprises a pair of spaced endless sprocket chains 125 and 126 mounted on a pair of sprockets 127 and 128 respectively, integrally secured to shaft 118, and a pair of spaced sprockets 129 and 130 mounted on a shaft 131, the ends of which are supported in a pair of spaced bearings 132 and 133 secured to horizontal support 121 with a plurality of bolts (see Figs. 20 and 21). A plurality of links 135 extend completely around the endless conveyor, the links being attached at their sides to sprocket chains 125 and 126. A sheet metal guard 136 is riveted to each link to provide a cover over the space between adjacent links (see Figs. 3, 4, 5 and 6). Each link is, in addition, provided with a central opening 137 (see Fig. 5) extending through a depending boss 138 under each link. A mandrel support 139 fits in opening 137, the upper end of which is provided with an enlarged boss portion 140 having a vertical opening 141 and a lateral set screw 142. The lower part of the mandrel support is provided with a removable and adjustable collar 143 securable to the support by means of a set screw 144. The construction is so designed that the bottom of boss 140 rests against the top of link 135 while collar 143 bears upwardly against the bottom of boss 138 in order to assure a tight assembly. Opening 141 in boss 140 is designed to receive a depending extension arm 145 of a mandrel 146 adapted to fit into the threaded hole of a blank nut 147, a laterally extending base 148 being provided between the mandrel proper and the depending extension arm which is designed to bear against the top of boss 140. This mandrel is also shown in Figs. 10 and 11. Set screw 142 may be turned to secure the depending extension arm securely.

As shown more particularly in Figs. 20 and 21, longitudinal support 121 is in effect divided into a front portion 150 and a back portion 151 which are joined by a constricted central portion 152 reinforced by a pair of spaced reinforcing members 153 and 154. Front portion 150 has a cut-away portion 155 to accommodate sprockets 129 and 130, and back portion 151 has a cut-away portion 156 to accommodate sprockets 127 and 128. Front portion 150 is provided with a pair of slack-takeup devices 170 and 171 adapted to move bearing blocks 132 and 133, respectively, in order to take up slack in endless conveyor 36. A pair of spaced mandrel guides 172 and 173 extend lengthwise across the mid-section of longitudinal support 121. Guide 172 is fastened to brackets 174 and 175, while guide 173 is fastened to brackets 176 and 177. A pair of sprocket chain guards 178 and 179 similarly extend across longitudinal support 121 and are secured to the same brackets.

As shown in Fig. 8, constricted central portion 152 of longitudinal support 121, in other words the section of the support between front portion 150 and back portion 151, rests in a recess 180 in lower fixed bearing block 59, the recess being somewhat wider than the constricted central portion to permit lateral sliding movement of the latter. An aligning plate 181 extends across the top of constricted portion 152 as well as front and back portions 150 and 151 directly below mandrel guides 172 and 173. As more particularly shown in Fig. 8, each mandrel support 139 is adapted to move along the top of the aligning plate, thus accurately locating each nut 147 mounted on its mandrel with respect to squeeze rolls 37 and 38. To assist in saddling longitudinal support 121 on lower fixed bearing block 59, front portion 150 of the longitudinal support is provided with a pair of vertically-spaced and laterally-extending pads 182 and 183 adapted to bear against the side of the bearing block. A similar pair of pads 184 and 185 is provided on back portion 151 of the longitudinal support adapted to bear against the other side of the bearing block. A pair of spaced struts 186 and 187 extend from front part 150 to back part 151 of longitudinal support 121 directly below bearing block 59, the struts being provided with a pair of nuts at each threaded end to permit the desired adjustments.

Referring more particularly to Figs. 3, 9, 17 and 18, the apparatus shown includes a nut-aligner 190 which comprises a pair of spaced and parallel guide wires 191 and 192 extending in the direction of the endless conveyor, wire 192 extending forward farther than wire 191. The wires are spaced a predetermined distance apart so that when nut 147 mounted on mandrel 146 is passed toward the squeeze rolls and the side of the nut strikes wire 192 and passes between both wires, the wires function to align opposite sides of the nut in parallel relationship with the wires so that the opposite sides of the nut are presented simultaneously for engagement with the squeeze rolls. The ends of wire 191 are secured to a pair of upright supports 193 and 194, in turn secured to brackets 195 and 196, which are fastened to the sides of upper fixed bearing block 62. The ends of wire 192 are similarly secured to a pair of upright supports 197 and 198, in turn secured to a lateral bracket 199 which is fastened to the inner end of upper laterally slidable bearing block 73.

Figure 17:
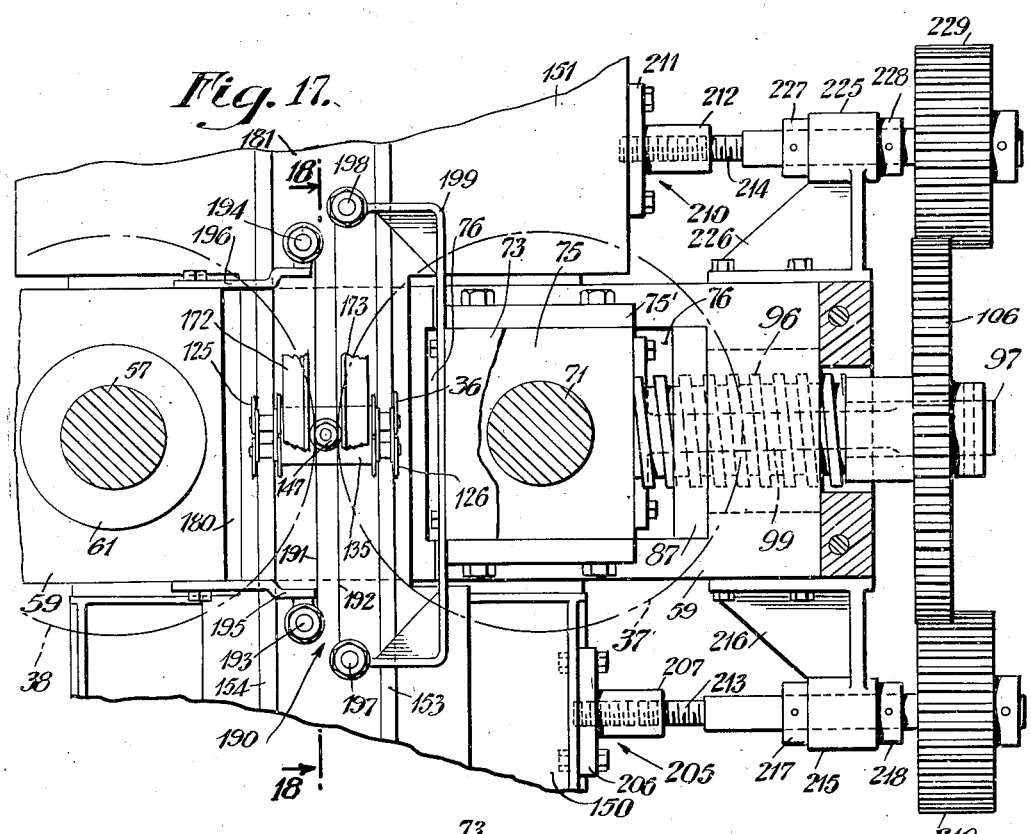
Fig. 17 is a view similar to Fig. 9, but showing the relative relation of the parts when deforming a smaller nut.
Figure 18:
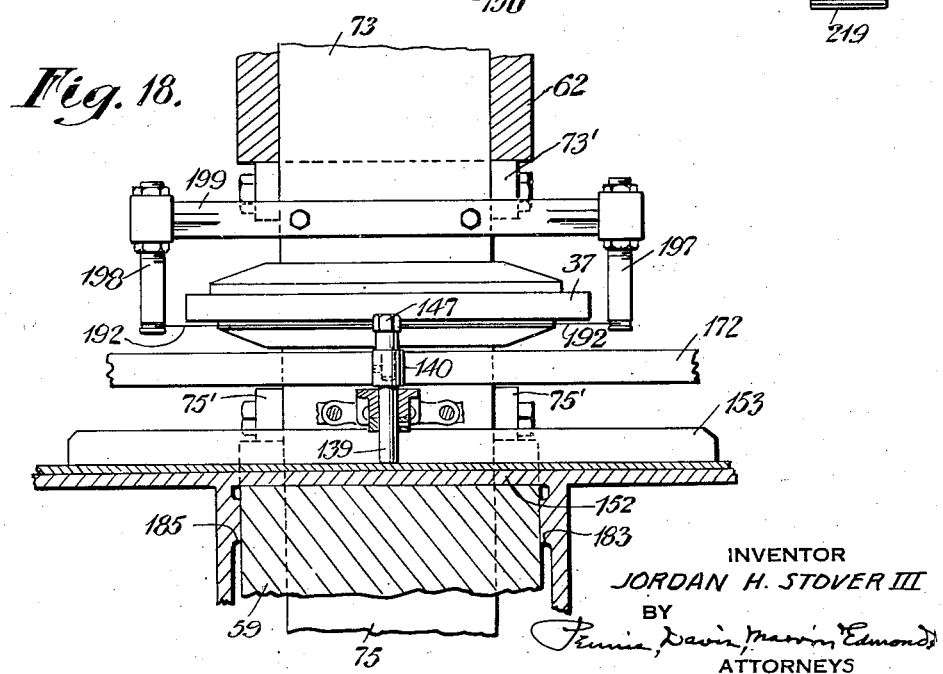
Fig. 18 is a section on the line 18—18 of Fig. 17, showing the aligning mechanism for presenting a pair of opposite sides of the nut to the squeeze rolls.

A draw nut 205 with a generally rectangular end or base portion 206 and a cylindrical hub portion 207 is secured to front portion 150 of longitudinal support 121 (see Figs. 3, 7, 9, 17, 20 and 21, and particularly Fig. 17). In similar fashion, a draw nut 210 with a generally rectangular end or base portion 211 and a cylindrical hub portion 212 is secured to back portion 151 of longitudinal support 121. Hub portions 207 and 212 are provided with square threaded lateral openings into which fit complementary square threaded draw screws 213 and 214, respectively. Draw screw 213 is mounted in a bearing 215 integrally supported by a bracket 216 secured to lower fixed bearing block 59, the draw screw being provided with a pair of collars 217 and 218 secured thereto at either side of bearing 215. An endless conveyor adjusting gear 219 is mounted at the other end of the draw screw. In similar fashion, draw screw 214 is mounted in a bearing 225 integrally supported by a bracket 226 secured to lower fixed bearing block 59, the draw screw being provided with a pair of collars 227 and 228 secured thereto at either side of bearing 225. An endless conveyor adjusting gear 229 is mounted at the other end of the draw screw.

Referring to Figs. 8, 9, 17 and 27, it will be seen that shaft extension 92 of draw screw 91 is keyed to and extends through hub 235 of adjusting gear 105 a convenient distance, the shaft extension being provided with an elongated lateral opening 236 in which an indicator shaft 237 is securely fitted. As socket crank 113 is turned to move upper laterally slidable bearing block 73 and lower laterally slidable bearing block 75, and hence endless conveyor 36, and their related parts, back and forth, indicator shaft 237 also turns. The outer end of indicator shaft 237 extends through a fixed bearing in casing or cover 35. An indicator pinion 248 is secured to the indicator shaft intermediate hub 235 and cover 35, the teeth of which mesh with the teeth of an indicator gear 239 mounted on a second indicator shaft 240 extending through a bearing secured in cover 35, the outer end of shaft 240 being provided with an indicator hand 241. In similar fashion, the outer end of first indicator shaft 237 is provided with an indicator hand 242. Referring next to Fig. 28, it will be seen that indicator hand 242 is associated with an outer calibrated scale 243, advantageously subdivided into thousandths of an inch. As shown, the scale is sub-divided into main graduations of ten thousandths of an inch, totalling 250 thousandths; in other words, ¼ inch. Indicator hand 241 is associated with an inner calibrated counter scale 244 sub-divided as shown into main graduations of 25 units, totalling 150. Movement of larger indicator hand 242 in a clockwise direction from zero all the way around the scale back to zero simultaneously moves smaller indicator hand 241 in a counter-clockwise direction one main graduation, namely 25 units; that is, ¼ inch. A movement of the smaller indicator hand from 0 to 0, namely 150 units, corresponds to 1½ inches. The object of the arrangement described is to indicate to the operator the amount of space 80 existing between squeeze rolls 37 and 38 or the amount of adjustment to be made in the space between the rolls. The size of pinion 107, gears 105, 106, 219 and 229 and their teeth and the size of draw screws 91, 96, 213 and 214 and their threads are so proportioned and correlated that when crank 113 is turned, squeeze roll 37 moves laterally twice as far as endless conveyor 36. This permits the centering of each nut 147 midway in space 80 between squeeze rolls 37 and 38.

As stated above in referring to Fig. 1, the apparatus includes a knurling device 39. The object of the knurling device is to provide the deformed nuts, that is the lock nuts, with a suitable marking so that they may be distinguished readily from conventional nuts and to indicate what portion of the nut is deformed. In the present construction, the knurling device cuts a crisscross pattern of lines in the top of the lock nuts. The device is shown in more detail in Fig. 3, and particularly Figs. 22 to 26, inclusive. Power take-off shaft 118, which operates endless conveyor 36, is also used to operate the knurling device. For this purpose, the far end of the shaft is provided with a gear 250 which in turn meshes with a gear 251 mounted on a horizontal jack shaft 252 extending back over and across the endless conveyor. The jack shaft is supported in a pair of spaced bearings 253 and 254, the former bearing being bolted to a pair of spaced vertical columns 255 and 256 and the latter bearing being bolted to a similar pair of spaced vertical columns 257 and 258, the bases of the columns being bolted to back portion 151 of horizontal support 121. The other end of the jack shaft is fitted with a sprocket 259 on which is mounted an endless sprocket chain 260, also mounted on a sprocket 261 on a shaft 262 extending laterally back over the endless conveyor. Shaft 262 rests in two split bearings 263 and 264, with a knurler roll 265 positioned therebetween, the bearings extending horizontally between a pair of vertical columns 266 and 267 near one end and a similar pair of vertical columns 268 and 269 near the other end, all of the columns being secured at their bottoms to back portion 151 of horizontal support 121 and their upper ends being threaded, as shown.

The four upright columns are fitted with three platens, a lower platen 270, a middle platen 271 and an upper platen 272. The upper platen is provided with a rising central rib section 273 at one end and a similar rising rib section 274 at the other end, these ribbed sections connecting with a centrally disposed and a wider bearing portion 275. The threaded end of each vertical column 267, 268 and 269 fits in a threaded sleeve 276 extending through the platen, the sleeve in turn being keyed in each case to a sprocket 277, the construction being identical for the assembly at the upper end of the three vertical columns. The fourth vertical column 266 is provided with a modified sprocket 278, secured to a special sleeve 279, the upper end of which terminates in an extension portion 280 adapted to fit into a socket crank. An endless sprocket chain 281 is mounted on the four sprockets.

A vertical shaft 285 extends through bearing portion 275 of upper platen 272, the lower end terminating in a head 286 to help hold it in position, the upper portion of the shaft having keyed thereon a pinion 287 meshing laterally with a pair of gears 288 and 289. The upper end of shaft 285 terminates in an extension portion 290 adapted to fit a socket crank. Gear 288 is integrally secured to the upper end of a thrust screw 291 extending through a threaded hole in bearing portion 275, the lower end of the thrust screw being adapted to engage a central rib 292 of middle platen 271. The gear 289 also carries a thrust screw 293 which also engages rib 292. An upper boss 297 and a lower boss 298 are provided at each of the holes in lower platen 270 through which the vertical columns extend, to provide more bearing and guiding surface. Split bearings 263 and 264 are integrally secured to the bottom of lower platen 270 by means of a plurality of stud bolts 299. The lower platen has a cut-away portion 300 through which the upper portion of knurler roll 265 extends. Reinforcing plates 301 are secured at opposite sides to strengthen the platen in the areas adjacent cut-away portion 300.

A plurality of appropriately spaced bolts 305 extend through upper platen 272, middle platen 271 and lower platen 270 and split bearings 263 and 264 to help support the lower portions of the split bearings. In addition, each bolt is provided with a compression spring 306 between middle platen 271 and lower platen 270. As a result of the arrangement described, shaft 262 and therefore knurling roll 265 are held in a position to be moved upwardly or downwardly, as desired.

A rough approximation for the operative position of the knurling roll is advantageously first obtained by fitting a socket crank on extension portion 280 and turning it to move sprocket chain 281 around sprockets 277 and 278 and hence to move upper platen 272 up or down, as required. This is done to place thrust screws 291 and 293 in a favorable operative position. When, therefore, a socket crank is fitted onto extension portion 290 of vertical shaft 285, thrust screws 291 and 293 are moved upwardly or downwardly, depending upon the direction of rotation of the socket crank. If thrust screws 291 and 293 are forced downwardly against central rib 292 of middle platen 271, springs 306 are placed under greater compression, thus forcing lower platen 270 and hence shaft 262 and knurler roll 265 downwardly. In other words, the knurler roll is forced more heavily against the top of deformed nut 147, and succeeding deformed nuts 147. If, however, the pressure of the knurler roll on the nut is too much, the operation may be reversed to release the compressive force of springs 306. Minute control of the amount of pressure of the knurling roll on the nut may thus be obtained by the use of the socket crank on extension portion 290.

The apparatus shown includes special means for withdrawing the deformed nuts from the mandrels as the endless conveyor moves around to its discharge end (see Figs. 1, 7 and 22). For this purpose, the apparatus includes a pair of spaced supports 310 and 311, the upper ends of which are attached to upright columns 257 and 255, and the lower ends to back portion 151 of horizontal support 121. A pair of spaced deformed nut strippers 312 and 313 are suitably suspended from supports 310 and 311 by a plurality of lateral arms 314. These strippers consist of strips of thin curved sheet metal, the inner edge portions of which are adapted to engage the bottoms of the deformed nuts. As shown in Fig. 1, the curvature of the strippers is such as to follow each mandrel to its upper end as it moves around the discharge end of the endless conveyor; that is, around chain sprockets 127 and 128. Therefore, as the fore or top parts of the strippers engage the bottom of each nut in its normal position on the mandrel, and the mandrel continues in its course around the sprockets, the deformed nuts ride on the strippers and are gradually moved upwardly to the top or end of the mandrels, from which the nuts are dropped. A chute 315 is located at the discharge end of the endless conveyor, being secured to cover 35, as shown in Fig. 1, to catch the nuts and direct them into a bin 316 located under the chute.

In referring to Figs. 5, 10 and 11 above, brief reference is made to mandrel 146. As more clearly shown in Figs. 10 and 11, the mandrel proper is divided into a lower cylindrical base portion 325, adapted to fit loosely in the lower portion of blank nut 147, and an upper cylindrical stop portion 326 of predetermined size adapted to act as a stop (see Fig. 11) when squeeze rolls 37 and 38 force opposite sides of the upper portion of the nut toward one another and the upper threads of the nut are brought into engagement with the stop portion. A modified form of mandrel 146' is illustrated in Fig. 12, in which base portion 325' and stop portion 326' are in the shape of a frustum of a cone. In both constructions, the surfaces are relatively smooth. The presently preferred construction is that of Figs. 10 and 11 because the cylindrical base and stop portions may be readily machined to size.

Lock nut 147 is shown in hexagonal form with a threaded central opening 331. The opening at the bottom portion 332 of the blank is circular but at the upper portion 333 it is generally elliptical, having a minor axis 334 and a major axis 335. The elliptical shape of the opening at the upper portion of the blank is the result of compressing or squeezing the upper portions 336 and 337 of opposite sides of the main body of the blank toward one another at the top portion to a depth of ¼ to ½ the nominal diameter of the mating screw beyond the elastic limit of the blank to provide a permanent distortion in the blank with the sides 338 and 339 of the opening on minor axis 334 pushed toward one another and with the sides 340 and 341 of major axis 335 pushed away from one another. The width of the top of the opening along the minor axis is reduced by the distortion by an amount equal to the fit tolerance plus 0.001 to 0.010 inch. The amount of inward distortion may be determined by measuring the distance from crest to crest of the first or upper full thread in the opening. This may be done with a vernier caliper or a taper plug gauge.

In a presently preferred practice of the invention, the width of the top of the opening along the minor axis is reduced by the distortion by an amount to produce a friction locking torque of $115 D^{2.4}$ to $820 D^{2.5}$ on a mating screw within the dimensional tolerances of its class of fit, in which D equals the nominal diameter of the mating screw and the result obtained is pound inches of torque. This value may be readily determined by screwing the lock nut on a mating screw, such as a bolt, with a conventional torque wrench.

Fig. 16 illustrates the use of the lock nut when screwed tightly onto a bolt 342 to secure the pieces of work 343 and 344. When the nut is applied to the bolt, it may be screwed at least ¼ of the way freely by hand since the lower part of the nut is not distorted. As the nut is screwed further onto the bolt, the distorted upper portion of the nut tends to assume its original undistorted form due to the resiliency of the metal wall of the nut. The bolt threads force the compressed sides of the nut apart against the spring action of the distorted upper portion of the nut. As indicated in the drawing, the threads along the inwardly distorted sides 338 and 339 on minor axis 334 of the nut tightly engage their mating threads on the bolt. This spring action causes the nut to grip opposite sides of the bolt and by reason of the amount of the distortion to make a strong friction pressure contact on the top as well as on the bottom of the bolt threads. Accordingly, the nut not only grips the bolt tightly but creates an additional friction area on the threads by pressing against the upper as well as the lower sides of the bolt threads even when the nut is tightened against the work.

In order that lock nuts made according to the invention be of general utility, it is highly desirable that they be adapted to receive standard socket wrenches and box end wrenches, as well as open end wrenches. In distorting the nut, its outside dimension measured at right angles to the direction in which it is squeezed is increased slightly. In other words, the distance across the nut is decreased along minor axis 14 and increased along major axis 15. This increased outside dimension along the major axis may be too great to permit placing a standard socket wrench or box end wrench of nominal size over the nut. It is therefore desirable to make the nut blanks in, for example, hexagonal form, somewhat smaller in cross-section than the conventional practice so that when the distance across the top of the lock nut is increased along its major axis, the nut may nevertheless fit into the wrench.

Some important advantages of the lock nut of the invention are its ease of manufacture; its ease of application; it may be tightened without damaging its own or its mating threads; it may be removed from a bolt without excessive difficulty; and it may be used again and again on the same bolt or on a different bolt. In addition, the lock nut locks itself to a bolt by a clamping action strong enough to resist loosening under severe vibration or repeated heavy shocks.

The application just described may be operated as follows:

Crank 113 is turned clockwise or counter-clockwise, as required, to adjust the width of space 80 between squeeze rolls 37 and 38 to accommodate the particular size of nut blank 147 to be deformed. In Fig. 17, for example, the nut is relatively small while in Fig. 9 it is relatively large. Operation of crank 113 simultaneously adjusts the space between parallel guide wires 191 and 192. Motor 47 is started which in turn sets squeeze rolls 37 and 38, endless conveyor 36 and knurling device 39 in motion. The driving parts are so proportioned and correlated that the endless conveyor, squeeze rolls and knurler move at substantially the same linear speed. A nut blank 147 is mounted on the free end of each mandrel 146 as it approaches the parallel guide wires and the squeeze rolls. If a corner or corner portion of the nut strikes guide wire 192, the nut is turned on the mandrel to align a pair of its opposite sides in parallel relationship with the guide wires. This relationship is maintained as the nut moves forward into additional sliding contact with guide wire 191. This operation assures proper presentation of the nut to the squeeze rolls.

The squeeze rolls and the nut on the mandrel are so positioned that only the upper portion of the nut comes into squeezing engagement with the rolls, the depth of squeeze, as pointed out above, being ¼ to ½ the nominal diameter of the mating screw. Since both squeeze rolls are power driven, the upper portion of the nut is readily gripped by the rolls and deformed as it passes between them. The thrust of the rolls is directly toward one another so that little or no resultant force extends downwardly toward laterally extending base 148 of the mandrel.

Crank 113 is suitably turned to provide space 80 between the squeeze rolls with the necessary width to deform the upper portion of the nut the requisite amount; upper portion 326 of the mandrel acting as a stop against excessive deformation while at the same time assuring each succeeding nut of an equivalent amount of deformation, falling within the limits above mentioned. In practice, nuts as they come from the squeeze rolls are measured to determine whether the width of the top of the opening along the minor axis is reduced by the distortion by an amount equal to the fit tolerance plus 0.001 to 0.010 inch. They are preferably tested with a torque wrench to determine whether the width of the top of the opening along the minor axis is reduced by the distortion by an amount to produce a friction locking torque of 115 $D^{2.4}$ to 820 $D^{2.5}$ on a mating screw within the dimension tolerance of its class of fit; in which, as previously pointed out, D equals the nominal diameter of the mating screw and the result obtained is pound inches of torque. An intermediate optimum value is selected and crank 113 is turned this way or that until the distorted nuts coming from the squeeze rolls match that value. Such checks and adjustments, if necessary, are made from time to time during the course of a day's operation of the apparatus to make certain that the lock nuts produced are substantially uniform in their friction locking torque.

Although provision is made for knurling the top of each lock nut as it leaves the squeeze rolls, this is a convenience rather than a necessity. Furthermore, the nut blank could be knurled before it enters the squeeze rolls, or for that matter, before it is mounted on its mandrel. Among important advantages of the practice disclosed are the following: The knurled top at once identifies the nut as a lock nut. Second, it indicates to the user that the knurling is adjacent the upper or distorted portion of the nut and that the un-knurled bottom should be presented to a mating bolt to assure easy screwing of the nut at least until the first threads of the bolt come into interfering or locking engagement with the distorted threads of the lock nut. In addition, a distinctive knurling design may be employed to identify the manufacturer's particular brand of lock nut.

In any event, as a given mandrel and nut are carried as a unit by the conveyor between the squeeze rolls, they pass under and in contact with knurling roll 265. As pointed out above in sufficient detail, various parts of the knurling device may be manipulated to vary the pressure of the roll on the top of the nut to assure the desired marking.

The conveyor then carries each succeeding knurled lock nut while still mounted on its mandrel to strippers 312 and 313 where the nuts are forcibly removed, dropped first into chute 315 and then into bin 316.

It will be clear to those skilled in this art that the specific method and apparatus just described may be suitably varied while still falling within the purview of the invention.

In my co-pending application Serial No. 621,-265, I have claimed a method for which the apparatus of the present invention is particularly suited.

I claim:
1. In apparatus for producing lock-nuts, the improvement comprising a mandrel adapted to be inserted in the threaded hole of a blank nut, the mandrel being provided with a stop portion of predetermined size, and means for forcing the opposite sides of the nut toward one another until threads in the hole of the nut engage the stop portion of the mandrel to distort the nut a predetermined amount.

2. In apparatus for producing lock-nuts, the improvement comprising a mandrel adapted to be inserted in the threaded hole of a blank nut, the mandrel being provided with a stop portion of predetermined size, and a pair of opposed and spaced compression members for forcing opposite sides of the nut toward one another until threads in the hole of the nut engage the stop portion of the mandrel to distort the nut a predetermined amount.

3. In apparatus for producing lock-nuts, the improvement comprising a mandrel adapted to be inserted in the threaded hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, and mechanism for effecting relative movement between the mandrel and the squeeze rolls to cause the mandrel and nut mounted thereon to pass as a unit between the squeeze rolls.

4. In apparatus for producing lock-nuts, the improvement comprising a mandrel adapted to be inserted in the hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, and means associated with the mandrel and nut mounted thereon for passing them as a unit between the squeeze rolls.

5. In apparatus for producing lock-nuts, the improvement comprising a mandrel adapted to be inserted in the hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, and means associated with the mandrel and nut mounted thereon for passing them as a unit between the squeeze rolls at the same linear speed as that of the squeeze rolls.

6. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, means for forcing opposite sides of the nut toward one another until threads in the hole of the nut engage the stop portion of the mandrel to distort the nut a predetermined amount, and means for advancing the movable support and hence each mandrel with a nut mounted thereon toward and between said forcing means.

7. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, and means for advancing the mandrel support and hence each mandrel with a nut mounted thereon toward and between said squeeze rolls.

8. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, and means for advancing the mandrel support and hence each mandrel with a nut mounted thereon toward and between said squeeze rolls.

9. In apparatus for producing lock-nuts, the improvement comprising a plurality of spaced mandrels mounted on a conveyor, each mandrel being adapted to be inserted in the threaded hole of a blank nut and each mandrel being provided with a stop portion of predetermined size, means for forcing opposite sides of the nut toward one another until threads in the hole of the nut engage the stop portion of the mandrel to distort the nut a predetermined amount, and means for moving the conveyor and hence each mandrel with a nut mounted thereon toward and between said forcing means.

10. In apparatus for producing lock-nuts, the improvement comprising a plurality of spaced mandrels mounted on a conveyor, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, and means for moving the conveyor and hence each mandrel with a nut mounted thereon toward and between said squeeze rolls.

11. In apparatus for producing lock-nuts, the improvement comprising a mandrel adapted to be inserted in the threaded hole of a blank nut, the mandrel being provided with a stop portion of predetermined size, and means for forcing the opposite sides of the nut toward one another until threads in the hole of the nut engage the stop portion of the mandrel to distort the nut a predetermined amount, said forcing means having contact surfaces juxtaposed to the opposite sides of the nut to make contact therewith only to a depth of ¼ to ½ the nominal diameter of the mating screw for the nut.

12. In apparatus for producing lock-nuts, the improvement comprising a mandrel adapted to be inserted in the threaded hole of a blank nut, the mandrel being provided with a stop portion of predetermined size, and a pair of opposed and spaced squeeze rolls for forcing opposite sides of the nut toward one another until threads in the hole of the nut engage the stop portion of the mandrel to distort the nut a predetermined amount, said squeeze rolls having contact surfaces juxtaposed to the opposite sides of the nut to make contact therewith only to a depth of ¼ to ½ the nominal diameter of the mating screw for the nut.

13. In apparatus for producing lock-nuts, the improvement comprising a mandrel adapted to be inserted in the threaded hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, said squeeze rolls having contact surfaces juxtaposed to the opposite sides of the nut to make contact therewith only to a depth of ¼ to ½ the nominal diameter of the mating screw for the nut, and means associated with the mandrel and nut mounted thereon for passing them as a unit between the squeeze rolls.

14. In apparatus for producing lock-nuts, the improvement comprising a mandrel adapted to be inserted in the hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, said squeeze rolls having contact surfaces juxtaposed to the opposite sides of the nut to make contact therewith only to a depth of ¼ to ½ the nominal diameter of the mating screw for the nut, and means associated with the mandrel and nut mounted thereon for passing them as a unit between the squeeze rolls.

15. In apparatus for producing lock-nuts, the improvement comprising a mandrel adapted to be inserted in the hole of a blank nut, the mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, said squeeze rolls having contact surfaces juxtaposed to the opposite sides of the nut to make contact therewith only to a depth of ¼ to ½ the nominal diameter of the mating screw for the nut, and means associated with the mandrel and nut mounted thereon for passing them as a unit between the squeeze rolls at the same linear speed as that of the squeeze rolls.

16. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, means for forcing opposite sides of the nut toward one another until threads in the hole of the nut engage the stop portion of the mandrel to distort the nut a predetermined amount, said forcing means having contact surfaces juxtaposed to the opposite sides of the nut to make contact therewith only to a depth of ¼ to ½ the nominal diameter of the mating screw for the nut, and means for advancing the movable support and hence each mandrel with a nut mounted thereon toward and between said forcing means.

17. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, said squeeze rolls having contact surfaces juxtaposed to the opposite sides of the nut to make contact therewith only to a depth of ¼ to ½ the nominal diameter of the mating screw for the nut, and means for advancing the mandrel support and hence each mandrel with a nut mounted thereon toward and between said squeeze rolls.

18. In apparatus for producing lock-nuts, the improvement comprising a plurality of spaced mandrels mounted on a movable support, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, one of the squeeze rolls being connected with means to cause its rotation in a clockwise direction and the other squeeze roll being connected with means to cause its rotation in a counter-clockwise direction, said squeeze rolls having contact surfaces juxtaposed to the opposite sides of the nut to make contact therewith only to a depth of ¼ to ½ the nominal diameter of the mating screw for the nut, and means for advancing the mandrel support and hence each mandrel with a nut mounted thereon toward and between said squeeze rolls.

19. In apparatus for producing lock-nuts, the improvement comprising a plurality of spaced mandrels mounted on a conveyor, each mandrel being adapted to be inserted in the threaded hole of a blank nut and each mandrel being provided with a stop portion of predetermined size, means for forcing opposite sides of the nut toward one another until threads in the hole of the nut engage the stop portion of the mandrel to distort the nut a predetermined amount, said forcing means having contact surfaces juxtaposed to the opposite sides of the nut to make contact therewith only to a depth of ¼ to ½ the nominal diameter of the mating screw for the nut, and means for moving the conveyor and hence each mandrel with a nut mounted thereon toward and between said forcing means.

20. In apparatus for producing lock-nuts, the improvement comprising a plurality of spaced mandrels mounted on a conveyor, each mandrel being adapted to be inserted in the threaded hole of a blank nut and each mandrel being provided with a stop portion of predetermined size, a pair of opposed and spaced squeeze rolls for forcing opposite sides of the nut toward one another until threads in the hole of the nut engage the stop portion of the mandrel to distort the nut a predetermined amount, said squeeze rolls having contact surfaces juxtaposed to the opposite sides of the nut to make contact therewith only to a depth of ¼ to ½ the nominal diameter of the mating screw for the nut, and means for moving the conveyor and hence each mandrel with a nut mounted thereon toward and between said squeeze rolls.

21. In apparatus for manufacturing lock nuts, the improvement comprising a pair of spaced and opposed compression members adapted to force opposite sides of a blank nut toward one another in the space between the compression members, a conveyor for the nuts associated with the compression members, and a plurality of spaced mandrels mounted on the conveyor with the line of travel of the mandrels passing through the space between the two compression members, each mandrel being adapted to receive a blank nut so that each nut may be positioned between the compression members as its mandrel is moved between the compression members by the conveyor.

22. In apparatus for manufacturing lock nuts, the improvement comprising a pair of spaced and opposed compression members adapted to force opposite sides of a blank nut toward one another in the space between the compression members, an endless conveyor for the nuts associated with the compression members, and a plurality of spaced mandrels mounted on the conveyor with the line of travel of the mandrels passing through the space between the two compression members, each mandrel being adapted to receive a blank nut so that each nut may be positioned between the compression members as its mandrel is moved between the compression members by the conveyor.

23. In apparatus for manufacturing lock nuts, the improvement comprising a pair of spaced and opposed squeeze rolls adapted to force opposite sides of a blank nut toward one another in the space between the squeeze rolls, a conveyor for the nuts associated with the squeeze rolls, and a plurality of spaced mandrels mounted on the conveyor with the line of travel of the mandrels passing through the space between the two squeeze rolls, each mandrel being adapted to receive a blank nut so that each nut may be positioned between the squeeze rolls as its mandrel is moved between the squeeze rolls by the conveyor.

24. In apparatus for manufacturing lock nuts, the improvement comprising a pair of spaced and opposed squeeze rolls adapted to force opposite sides of a blank nut toward one another in the space between the squeeze rolls, a conveyor for the nuts associated with the squeeze rolls, and a plurality of spaced mandrels mounted on the conveyor with the line of travel of the mandrels passing through the space between the two squeeze rolls, each mandrel being adapted to receive a blank nut so that each nut may be positioned between the squeeze rolls as its mandrel is moved between the squeeze rolls by the conveyor, and power driving means connecting the squeeze rolls for rotating them in opposite directions toward each mandrel as it advances to and passes between the rolls so that each nut may be gripped and squeezed by the rolls as it passes between them while still mounted on its mandrel.

25. Apparatus as defined in claim 21, comprising also a stripping device located adjacent the path of the conveyor and beyond the compression members, reckoned in the direction of movement of the conveyor, for successively removing the nuts from the mandrels after their passage through said space.

JORDAN H. STOVER, III.

No references cited.